United States Patent
Backhaus et al.

(10) Patent No.: US 6,272,572 B1
(45) Date of Patent: Aug. 7, 2001

(54) APPARATUS AND METHOD FOR TRANSMITTING AND RECEIVING PASSENGER SERVICE SYSTEM AND TELEPHONE SIGNALS OVER A NETWORK

(75) Inventors: Clayton R. Backhaus, Yorba Linda; Gregory K. Henrikson, Brea, both of CA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 09/154,256

(22) Filed: Sep. 16, 1998

Related U.S. Application Data

(63) Continuation-in-part of application No. 08/791,754, filed on Jan. 29, 1997.

(51) Int. Cl.[7] .................................................. G06F 13/00
(52) U.S. Cl. ........................ 710/100; 710/57; 710/109; 710/111; 709/222; 709/250
(58) Field of Search ........................... 701/36; 455/567; 340/825.17; 710/100, 111, 109, 57; 348/8; 709/222, 250

(56) References Cited

U.S. PATENT DOCUMENTS

| | | | |
|---|---|---|---|
| 5,848,367 | * 12/1998 | Lotocky et al. | 701/36 |
| 5,854,591 | * 12/1998 | Atkinson . | |
| 5,963,877 | * 10/1999 | Kobayashi | 455/567 |

* cited by examiner

*Primary Examiner*—Rupal Dharia
(74) *Attorney, Agent, or Firm*—Nathan O. Jensen; Kyle Eppele; James P. O'Shaughnessy

(57) ABSTRACT

A system and method of distributing telephone and passenger service signals from a zone interface unit to a plurality of seat electronic units in an in-flight entertainment system is described. The method uses a master/slave arrangement in which multiplexed telephone and passenger service signals are transmitted over a bus to the receiving seat electronic units.

16 Claims, 6 Drawing Sheets

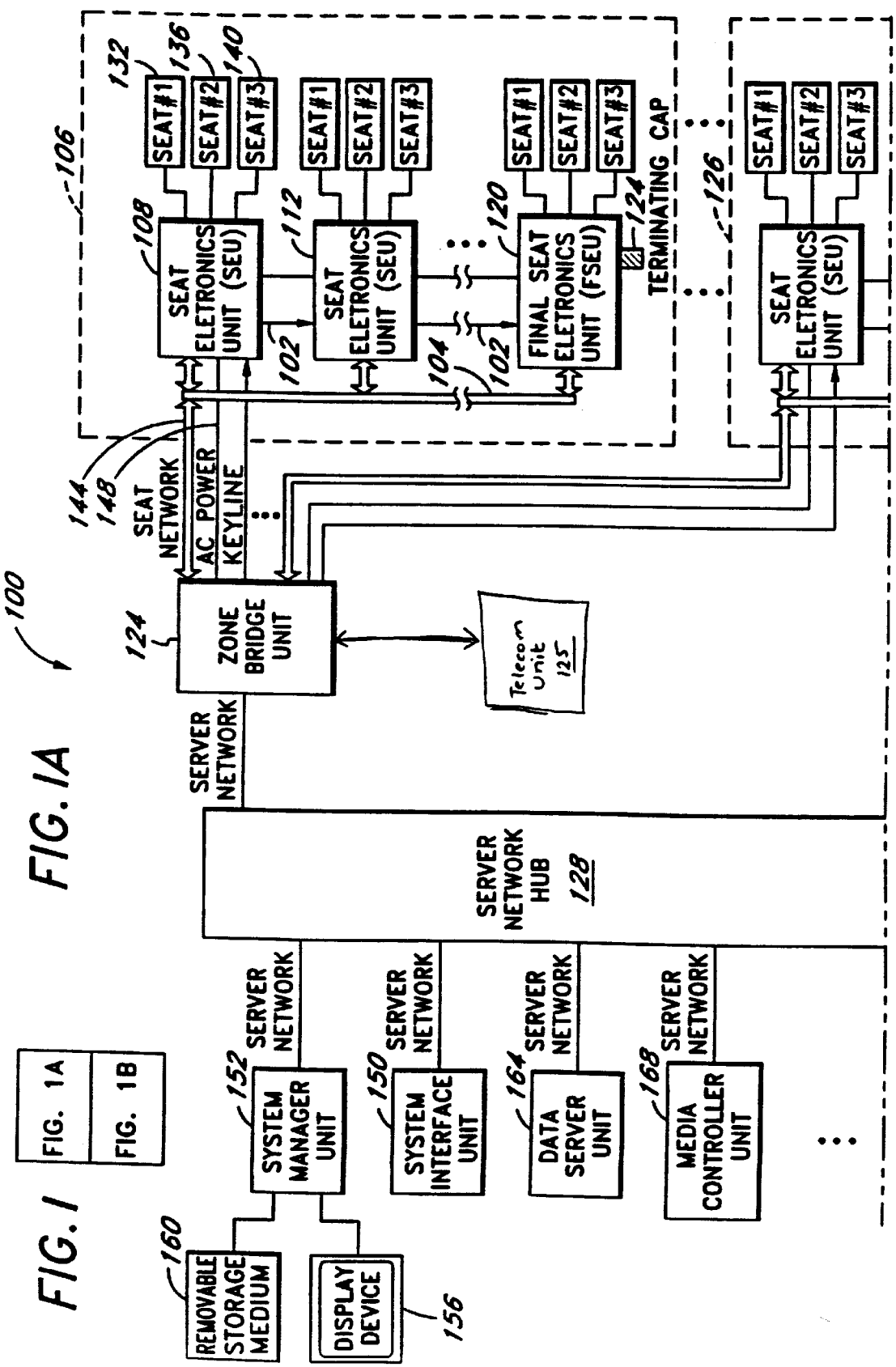

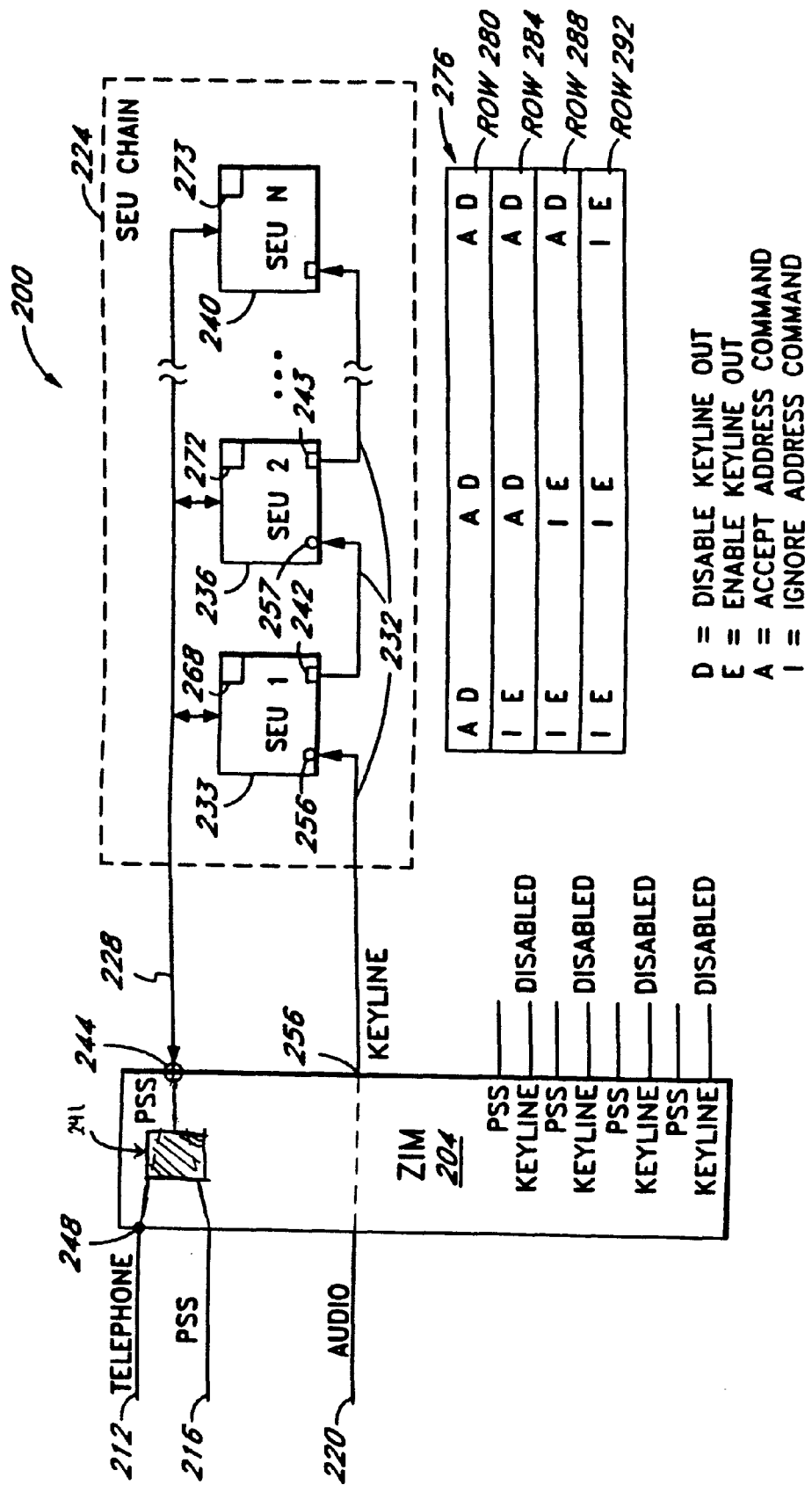

APPARATUS AND METHOD FOR TRANSMITTING AND RECEIVING PASSENGER SERVICE SYSTEM AND TELEPHONE SIGNALS OVER A NETWORK

This application is a continuation in part of a related application Ser. No. 08/791,754, filed Jan. 29, 1997, entitled Dynamic Addressing of Devices on a Shared Medium Network with a Keyline.

BACKGROUND OF THE INVENTION

1. Field of the Invention

The present invention relates to communicating data in an in-flight entertainment system. In particular, the invention describes a method and apparatus for combining passenger service data with audio and telephone data in an in-flight entertainment system.

2. Description of Related Art

Over the last few decades, commercial aircraft have become a necessary mode of travel for personal and business reasons. In order to improve passenger comfort, many commercial airlines now offer on-board telephones as well as in-flight entertainment, such as video games, pay-per-view movies, hotel reservation services and the like. Such amenities require supporting electronics distributed throughout the aircraft.

Traditional systems for distributing electric signals in an aircraft involve using separate cables for each type of data being distributed. For example, separate cables were used for telephone data and passenger service system ("PSS") signals. The result was that many cables were needed. Additional cables add to the weight of the aircraft, increase the complexity of the circuitry, and take up valuable space in the small conduits designed for containing wires which distribute signals throughout the aircraft.

Thus, a system was needed to more efficiently distribute electric signals to the appropriate devices in the aircraft. Such a system for distributing PSS and telephone signals would ideally be simple and easy to maintain. Thus complicated circuitry is avoided while maintaining as much compatibility as possible with pre-existing methods of distributing telephone and passenger data.

Accordingly, an improved method of distributing passenger and telephone data will be described.

SUMMARY OF THE INVENTION

The present invention is a system and method for distributing telephone and passenger service signals between a master unit and a chain of slave units in an aircraft. In one embodiment of the present invention, the telephone signal and the passenger service signal is multiplexed onto a bus. The information on the bus is communicated to a plurality of seat electronic units which act as slave units to the master unit.

BRIEF DESCRIPTION OF THE DRAWINGS

The advantages of the present invention will become more readily apparent to those ordinarily skilled in the art after reviewing the following detailed description and accompanying drawings, wherein:

FIG. 1 which includes FIG. 1A

FIG. 2 is an embodiment of a system for distributing PSS and telephone data as shown in the block diagram.

DETAILED DESCRIPTION

In the following description, various embodiments of the system for distributing signals throughout an in-flight entertainment system will be described. For example, the description will include details including the use of time division multiplexing to combine telephone and passenger system service ("PSS") information and will also describe the sequencing of data in the multiplexed signal. However, such details are included to facilitate understanding of the invention and to describe alternative embodiments for implementing the invention. Such details should not be used to limit the invention to the particular embodiments described because other variations which would be obvious to one of ordinary skill in the art are possible while staying within the scope of the invention.

Figure 1B:
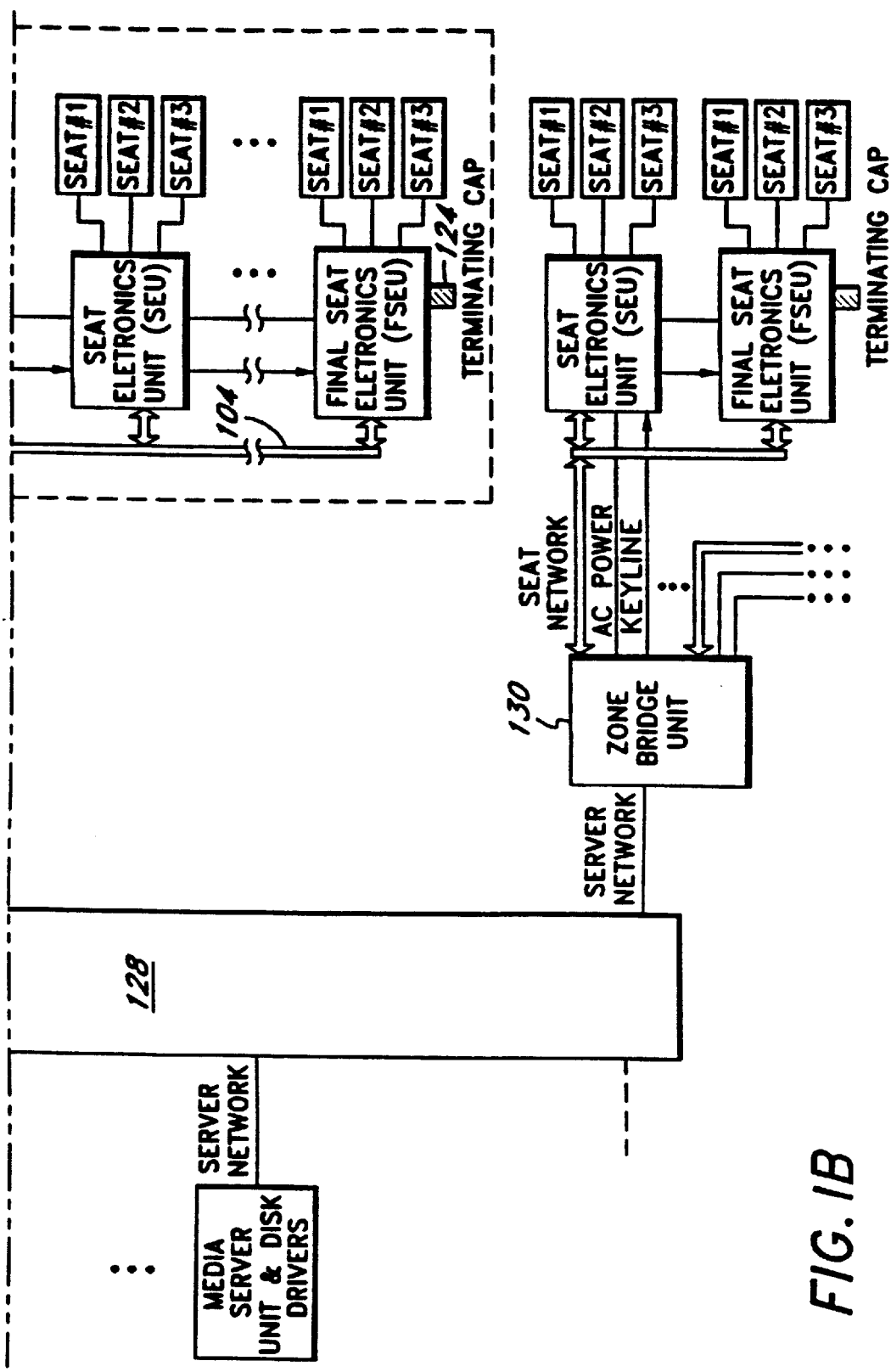
FIG. 1B illustrates an exemplary in-flight entertainment system for use with a system for distributing telephone and PSS data.

FIG. 1A and 1B together shows an overall schematic view of the SEU initialization system 100 as used in an in-flight entertainment system IFES for airborne applications. The SEU initialization system 100 includes a multiplexed audio (MA) line or a keyline 102 and a Passenger Service System/Audio Telephone ("PAT") bus or interconnection bus 104, to connect a chain 106 of interconnected seat electronic units ("SEUs") 108, 112, 120. Each chain 106, is terminated by a final seat electronics unit ("FSEU") 120. A ZBU 124 supports multiple chains 106, 126 and provides each SEU in the chain 106, 126 with the necessary audio and video signals. A Server Network Hub 128 coordinates and communicates the information to and from multiple ZBUs 124, 130 to the SEU chains.

Each SEU, e.g. SEU 108, provides the necessary audio and video signals to support a number of passenger seats 132, 136, 140 in the passenger compartment of an aircraft. In one embodiment an SEU may support two, three or more passenger seats depending on various parameters such as the aircraft configuration used, and the number of slots in an SEU box. In the described embodiment, up to 12 SEUs are chained together although the number of SEUs in a chain may vary.

Each ZBU 124 typically services one section or zone of an aircraft. A ZBU 124 may service multiple chains 106, 126. A typical chain 106, 126 may serve an aisle of a plane while each ZBU 124 serves a plane section. The interconnect bus and keyline together connect each SEU in a chain. Each chain is terminated at a corresponding final seat electronics unit ("FSEU") e.g. FSEU 120. The FSEU includes terminating cap 124 which terminates interconnect bus 104.

During initialization, the ZBU 124 distributes enable signals along keyline 102. Other exemplary initialization instructions including address write signals, and ignore instructions may be transmitted along PAT bus or interconnect bus 144. After initialization, keyline 102 may be used for other purposes, such as carrying multiplexed audio signals.

The ZBU 124 also receives and distributes telephone and passenger service signals. In one embodiment, the telephone service signals are received from a telecommunications unit 125. The telecommunications unit 125 communicates telephone data with a link to ground or a satellite link such as SATCOM, NATS, or TFTS. The received signal is converted to an E-1 telephone signal and transferred to ZBU 124. Telecommunications unit 125 is commercially available from Casio Corporation.

In one embodiment, interconnect bus 144 is a twisted pair cable which carries multiplexed telephone signals and passenger service signals between ZBU 124 and SEUs 108, 112, 120. Power is sent along a separate power line 148 and video transmission may occur on a separate video bus (not shown) to the SEUs 108, 112, 120. The SEUs may also be coupled together by other buses to facilitate communication of other information.

Each SEU may also transmit data such as credit card information, entertainment requests, or merchandise orders from individual passengers via seat electronics including handsets (not shown) in the vicinity of passenger seat 132, 136, 140 to the ZBU 124 along the interconnect bus 144. This information may be routed through the server network hub 128 to other electronics aboard the aircraft, or in the case of telephone or other communication, to public switched telephone networks ("PSTN") or other external networks outside of the aircraft through a system interface unit 150. A system manager unit (SMU) 152 oversees operation of the in-flight entertainment system IFES. The SMU 152 is coupled to a display device 156 which displays passenger requests and system status information. A removable memory device 160, such as a floppy disk drive, is also provided for removably storing data.

The IFES including the SMU 152 and the SEUs 108, 112, 120 is designed to perform an initialization routine after new SEUs have been added or old SEUs have been removed from the IFE system. In particular, upon start-up the SMU may run routines which assign a unique address to each SEU in the aircraft. The model of the aircraft flown (for example, Boeing 747, DC-10, Boeing 767) determines the configuration of the SEUs, the routing of the interconnect bus 144 and the assignment of SEU addresses.

FIG. 2 is a block diagram schematic 200 of one SEU arrangement used in Boeing aircraft to distribute telephone and PSS signals. The zone interface module (ZIM) 204 shown in FIG. 2 is a sub-portion of the ZBU 124 shown in FIG. 1a. Each ZIM 204 handles information coming in from telephone lines 212, passenger service system lines (PSS lines) 216 and audio lines 220. Each ZIM 204 routes the information to appropriate SEU chains e.g. SEU chain 224.

Each SEU chain 224 is coupled to the ZIM 204 via an interconnect bus 228. The interconnect bus 228 is an addressed bus which carries passenger service system ("PSS") data and telephone data between the ZIM 204 and SEUs such as SEU 233, 236, 240 in the SEU chain 224. In one embodiment, the PAT bus is a bi-directional master/slave polled bus which runs between the ZIM 204 and the SEUs 233, 236, 240. The ZIM 204 acts as the interconnect bus master, and each SEU, e.g. 233, 236 coupled to the interconnect bus acts as bus slaves. The interconnect bus 228 itself may be implemented on shielded twisted pair wiring conforming to the RS-485 standard as described in "EIA Standard for Electrical Characteristics of Generators and Receivers for Use in Balanced Digital Multipoint Systems, RS-485," Electronic Industries Association, Washington, D.C., April 1983. One embodiment of such an interconnect bus utilizes a multidrop topology for connection to the SEUs.

In such an embodiment, the ZIM 204 receives data from both the PSS line 216 and the telephone line 212 and multiplexes the data in multiplexing circuitry 241. Multiplexing circuitry 241 combines the PSS data and the telephone data for transfer along interconnect bus 228. The PSS data transmitted along PSS line 216 may include switch poll/responses and information on data configurations. The telephone interface 248 transfers command data along with standard telephone communications. The telephone data transferred, in one embodiment, conforms to a telephone communication standard such as the CEPT E-1 standard. Information on the interconnect bus 228 is routed to each SEU according to a unique 5 bit address assigned to each SEU 233, 336, 240. The interconnect bus 228 may also broadcast signals which are received by and acted on by every SEU coupled to the interconnect bus 228.

In the illustrated embodiment of FIG. 2, keyline 232 serves a dual purpose. During the initialization phase, the keyline is used for transferring control signals such as enable or sync signals to the SEUs 233, 236, 240. After the initialization of the system is completed, the keyline 232 can be used to carry multiplexed audio (MA) signals from the ZIM 204 to the SEUs 233, 236, 240.

One implementation of keyline 232 is a shielded twisted pair wire conforming to the RS-485 standard. Other acceptable implementations may use different protocols including optical interconnect standards. The keyline 232 is a unidirectional, non-arbitrated bus. The keyline 232 is coupled to the SEUs in a daisy chain or sequential configuration such that a segment of keyline 232 links a keyline output e.g. 242 to a keyline input e.g. 257 of a neighboring SEU. Signals from the keyline 232 are received and redriven from SEU 233 to the next or subsequent SEU e.g. 236 in the sequence.

Each SEU output 242, 243 which redrives signals propagating along the keyline 232 can be disabled and enabled by a disable command transmitted along the interconnect bus 228. After initialization of the system is complete, the keyline 232 may be used for transferring other types of data. In one embodiment of an in-flight entertainment system, the keyline 232 is used to transfer audio information from storage devices (e.g. compact disk players, and media servers) to individual passengers via headphones.

Each SEU chain 224 includes a final SEU (FSEU) 240 which terminates the SEU chain 224. Intermediate SEUs 233, 236 are SEUs between the ZIM 204 and the final SEU 240. The intermediate SEU's along with the keyline couple the final SEU 240 to the ZIM 204. In one embodiment, the SEUs in a chain are sequentially connected in a chain such that the keyline 252 inputs data into an SEU e.g. SEU 233 via ZIM 204 keyline output 256. Each intermediate SEU 232, 236 also preferably redrives the signal switching being transmitted along the keyline 232 although on and off switching may be sufficient. The intermediate SEU preferably outputs the redriven signal to the next or subsequent SEU along the keyline via a keyline output 242, 243. Thus for a particular SEU e.g. 240 in a chain to receive data along the keyline, all preceding SEUs e.g. 233, 236 (preceding meaning SEUs connected in the chain serially between the receiving SEU and the ZIM 204) must allow data to flow through the keyline inputs 256, 257 and keyline outputs 242, 243.

As depicted, an interconnect bus or PAT bus 228 in multi-drop line configuration carries telephone and PSS data to each SEU. During the initialization period, address assignments including address write commands may be transmitted as broadcast signals along the PAT bus 228. The address assigned to a particular SEU is stored in a non-volatile erasable memory e.g. 268, 272, 273 in the respective SEU 233, 236, 240. This non-volatile erasable memory may take a variety of forms, in one embodiment a flash memory is used.

The chart 276 shows the various states of each SEU at various points in time during initialization. At a beginning state (Row 280) all SEUs in the SEU chain 224 are set to have their keyline outputs disabled and set to accept address commands. An enable signal is transferred along a first segment of keyline 232 to the first SEU 233 (the SEU closest to the ZIM 204 or the first SEU to receive the enable signal). An assigned address corresponding to the first SEU 233 is broadcast along interconnect bus 228. The first SEU 233 stores the assigned address in its non-volatile erasable memory 268 such as a flash memory circuit. An ignore instruction instructing the first SEU 233 to ignore future address write signals is transmitted along the interconnect bus 228. An enable output instruction causing the first SEU to enable its keyline output 242 is also transmitted along interconnect bus 228 and addressed to the first SEU 233. Thus, after receiving its assigned address, the first SEU 233 is set to ignore future address write commands and enables its keyline output to forward the enable signal to a subsequent or neighboring SEU 236. The status of the SEUs 233, 236, 240 after the first SEU 233 has received its address assignment is shown in Row 284 of the chart.

The first SEU 233 forwards the enable signal along a segment of keyline 232 to a subsequent SEU 236. The address of the subsequent SEU is broadcast in an address write signal via the interconnect bus 228. Preceding SEUs such as the first SEU 233 were instructed to ignore broadcast address write signals when they received their addresses. SEUs further down the chain have not received the enable signal forwarded along the keyline 232 and are thus still disabled. Thus only the most recently enabled SEU 236 assigns the address to its flash memory 272. After writing the address to memory, the SEU 236 is addressed via interconnect bus 228 and instructed to ignore future address commands and to enable its keyline output 243. The status of the SEUs immediately after the subsequent SEU has forwarded the enable command is shown in Row 288.

The procedure for assigning an address to an SEU continues until the last SEU 240 in an SEU chain 224 has received its address at which time every SEU in the chain has an enabled keyline output and is ignoring broadcast address write signals. This state is shown in Row 292. After completion of a chain, a previously disabled keyline output from ZIM 204 is enabled. The assignment process is repeated for every SEU chain connected to ZIM 204 until every SEU in the aircraft has been assigned an address. After initialization, the interconnect bus 228 is used to transfer multiplexed control and telephone signals.

Figure 3:
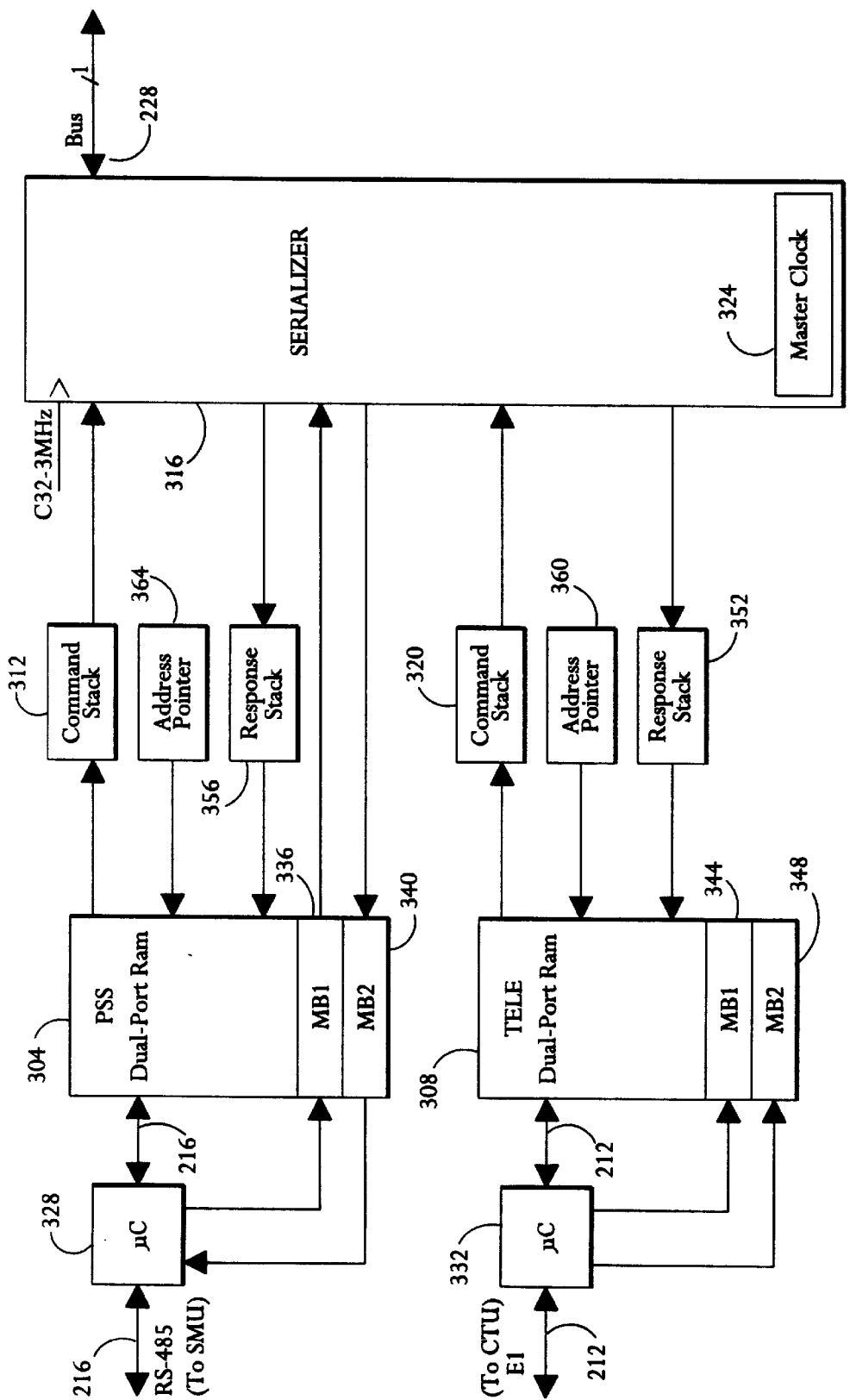
FIG. 3 is an embodiment of a multiplexing circuitry within the ZIM.

FIG. 3 is a block diagram schematic illustrating one method of implementing the multiplexer circuit 241 of FIG. 2 to combine the control and telephone signals. In the illustrated embodiment, the multiplexer circuit 241 includes two dual port random access memories ("dual port RAM") 304, 308. First dual port RAM, the PSS dual port RAM 304, receives data from PSS line 216 while the second dual port RAM, the telephone dual port RAM 308 receives telephone data along telephone line 212. The output of the PSS dual port RAM 304 is stored in a temporary memory such as a command stack first input first output ("command stack FIFO") 312 where it is stored until needed by serializer 316. Similarly, data from telephone dual port RAM 308 is transferred to a second command stack FIFO 320 where it is stored until needed by serializer 316. Serializer 316 converts the parallel streams of data from command stacks 312, 320 to a serial stream of data which is output along interconnect bus 228. A clock 324 within serializer 316 provides the timing signal for serializer 316. In one embodiment of the invention, the serializer 316 time division multiplexes the two parallel streams of data from the two command stacks 312, 320 onto interconnect bus 228.

Microcontrollers 328, 332 coordinate the flow of data to and from the dual port RAMS 304, 308 and serializer 316. Microcontroller 328 communicates with mailboxes 336, 340 to control the flow of PSS data. These mailboxes store the interrupts which indicate when data is received and output by dual port RAM 304 and serializer 316. Similarly, microcontroller 332 communicates with mailboxes 344, 348 to control the flow of telephone data. The telephone microcontroller 332 controls the flow of data using interrupts between telephone dual port RAM 308 and serializer 316.

Because interconnect bus 228 is bi-directional, multiplexer circuit 241 handles data traveling in two directions, from ZIM 204 to SEUs 233, 236, 240, as well as from the SEUs back to the ZIM. To handle the data flow from the SEUs, serializer 316 transfers SEU response telephone data to a telephone response stack 352 and SEU response PSS data to a PSS response stack 356. Telephone data in telephone response stack 352 is transferred through telephone dual port RAM 308 back to the telephone line 212. Likewise, PSS information is transferred from the serializer 316 to PSS response stack 356 back to the PSS dual port RAM 304 where it is communicated to PSS line 216. Address pointers 360, 364 indicate the location in corresponding dual port RAMs 304, 308 from which information is transferred.

Figure 4:
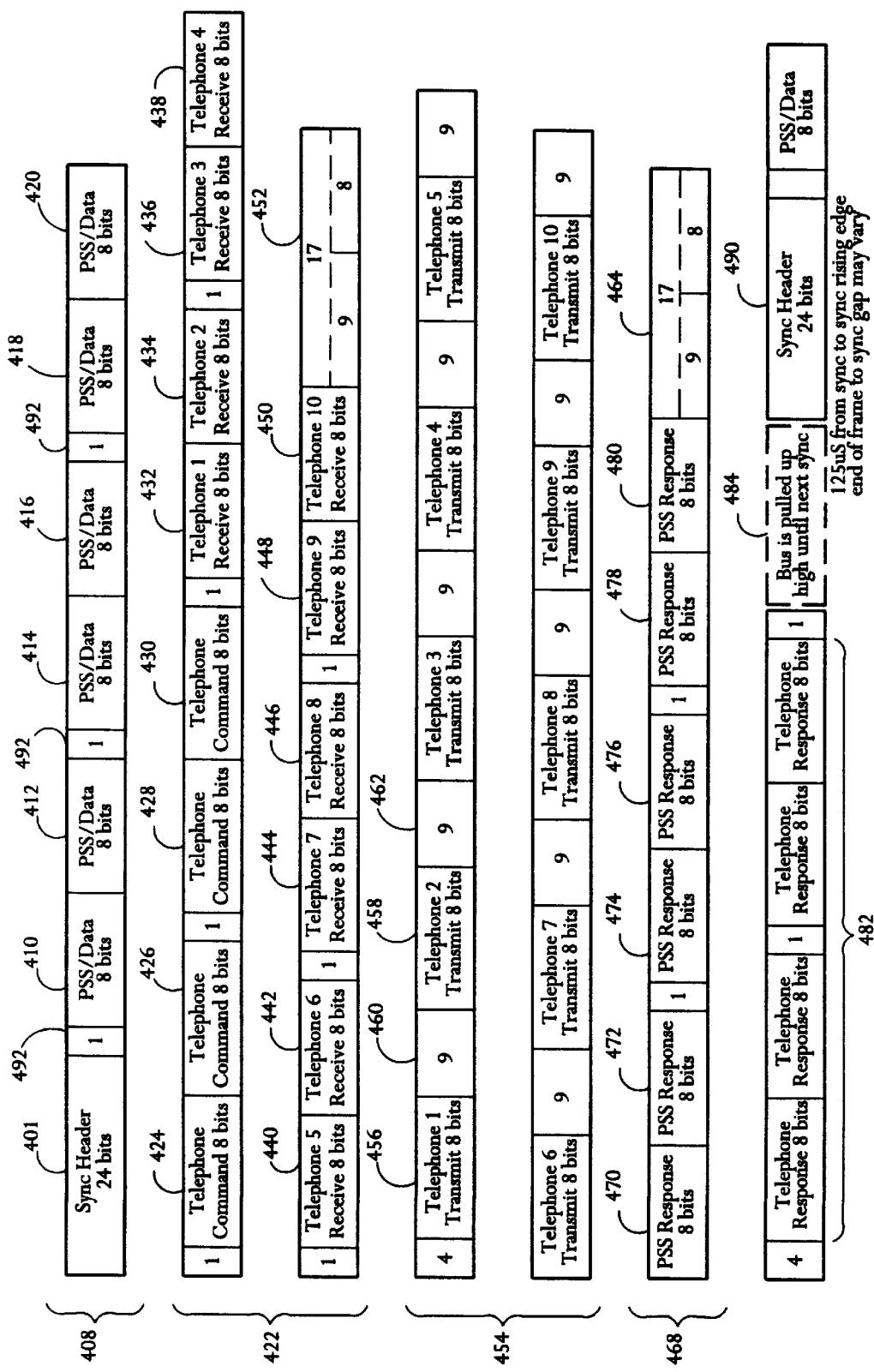
FIG. 4 illustrates one frame of data output by the multiplexing circuitry of FIG. 3.

In one embodiment of the invention, the output of serializer 316 is a time division multiplexed sequence of data containing both PSS data and telephone data. FIG. 4 illustrates a frame 400 of data output by serializer 316. The PSS/telephone frame illustrated is based on a 125 microsecond (8 kilohertz) frame timing. The first 24 bits 404 of the PSS/telephone frame 400 contains a 24 bit sync header to identify the start of the frame. In one embodiment, the sync header is 3 high bits followed by 21 low bits. SEUs detect the rising edge of the start bits (the initial three logic ones) to resynchronize the clocks.

Following sync header 304, the first line of data 408 of frame 400 contains PSS data for transfer from ZIM 204 to SEUs 233, 236, 240. The PSS data is divided into 8 bit units, the first 8 bits or first byte 410 contains address data followed by PSS command data 412. Three bytes of PSS data 414, 416, 418 follow. A check sum byte 420 terminates the sequence of PSS data bytes. Check sum byte 420 allows the receiving SEU to detect when an error occurs in transmission. If an error occurs, retransmission of PSS data may follow in the next frame.

The next two lines of data 422 contain telephone data for transfer from the ZIM to the SEUs. The first byte of data 424 of the telephone data contains the address of a telephone followed by two bytes 426, 428 of telephone command data. A check sum in data byte 430 determines whether the telephone command data was properly received. The commands to the telephone are followed by digitized telephone audio information traveling from the ZIM to the SEUs. The illustrated configuration supports up to ten simultaneous telephone conversations. Each frame 400 of data contains one byte 432, 434, 436, 438, 440, 442, 444, 446, 448, 450 from the ZIM to each SEU for each of the ten telephone conversations. After the last telephone byte 450 is transferred from the ZIM to the SEUs, a switchover signal is transmitted in block 452. The switchover signal indicates that data transmission from the ZIM to the SEUs is complete and that the SEUs may begin transmission of data to the ZIM.

The first two lines of data 454 from the SEU to the ZIM contains telephone data. The ten telephone conversations each transmit one byte of data such as telephone data bytes 456, 458. Each telephone data bytes 456, 458 is followed by a corresponding wait period 460, 462. The wait period prevents telephone signals transmitted from SEUs at different points on the interconnect line from creating collision problems due to the propagation time of the telephone signals. Once the ten telephone bytes of data have been transferred, the PSS data is transferred from the SEU to the ZIM in line 468 of the frame 400. In the illustrated embodiment, eight bytes of PSS response data is transferred from the SEUs to the ZIM. The transmitting SEU uses six bytes of PSS data to acknowledge the previously transmitted data of line 408. After a wait period 474, to prevent overlap of PSS data with telephone response data, the telephone response data is transmitted in the subsequent four bytes of data 482. In byte 484, PAT bus is pulled high until the next sync header is transmitted in block 490.

A false sync can occur when a long stream of outgoing PSS data or telephone data are zeros creating a long sequence of zeros similar to the long sequence of zeros in the sync header. Thus, bits of data 492 are inserted between data units to prevent false syncs.

The embodiment described implements the PSS/telephone interconnect bus as a master/slave, poll/response system in which only the master unit, the ZIM, initiates data transfers. The slaves, e.g., the SEUs, respond to the ZIM to complete the data transfer cycle. Non-broadcast messages generated by the ZIM master are acknowledged by the SEU slaves. In the illustrated embodiment, the ZIM is the master of the PSS/telephone interconnect bus. The ZIM 204 originates message types and is the destination for SEU 233, 236, 240 responses.

Figure 5:
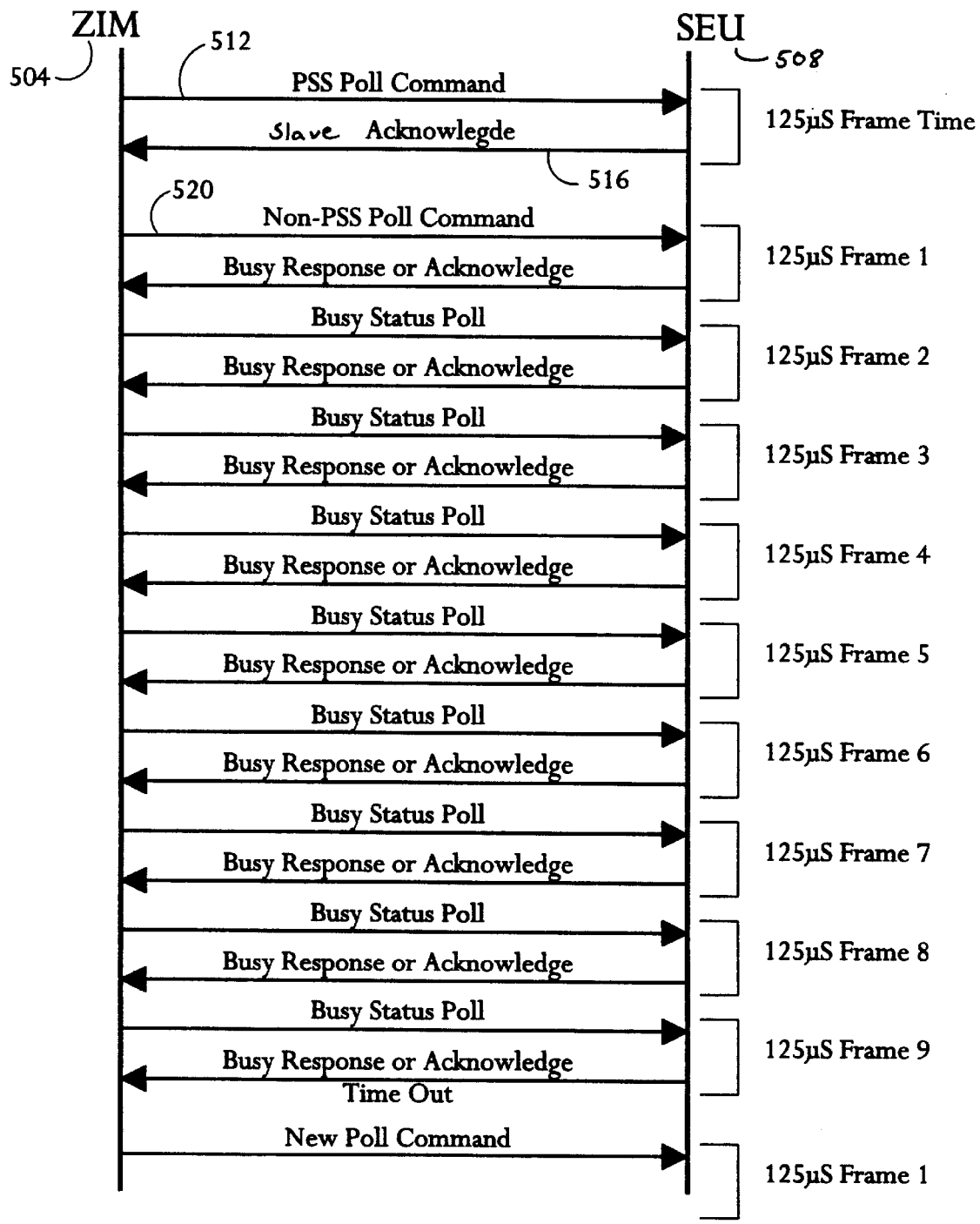
FIG. 5 illustrates the polling sequence in a data transfer between a zone interface unit and a seat electronic unit.

The response format used in one embodiment of the present invention is illustrated in FIG. 5. ZIM master 504 and the SEU slave 508 are schematically illustrated in FIG. 5. In a first signal transfer 512 the ZIM master 504 transmits a PSS poll command to the SEU slave 508. The PSS poll command is of fixed length, typically six bytes, and allows responses of six bytes. Longer messages are communicated for data downloads and uploads by chaining multiple messages together.

SEUs respond to commands within the same data frame, either with a busy response or a valid acknowledge assuming there has not been a check sum error during the transmission. Failure of the SEU slave to acknowledge or respond indicates that the slave has not successfully received the message from the ZIM master. The sequence of data transfers is illustrated in FIG. 5. In FIG. 5, the ZIM master 504 transmits a command message 512 to the SEU slave 508. If the slave successfully receives the command, it responds and sends an acknowledgment in response line 516. This indicates to the ZIM that the address slave has received the command.

In the frame immediately following, the ZIM transmits the slave's address and command code in line 520. The ZIM then polls the slave to determine completion of the command message previously sent. Polling continues in subsequent frames until ZIM 504 receives a command code that does not correspond to the predetermined command code. Receipt of command codes which match predetermined command codes indicates that the slave has not finished processing the command data. When ZIM 504 receives a command code that does not match the predetermined command code, the slave has either finished processing the command message or has responded with data for the ZIM to process. The ZIM may then transmit another command over the PSS/telephone bus.

When a check sum error occurs during the polling process, the ZIM aborts the polling cycle and returns an error of condition. The ZIM may then attempt error recovery and resend the transmission of the command message to the slave SEU.

Slave SEU 508 also may time out during processing of the command message. Time out is indicated by the slave SEU's failure to send any command code other than the predetermined command code for an unreasonable length of time. When time out occurs, the ZIM terminates polling and returns a time out condition. Upon time out, the ZIM resends the predetermined command code as an original command in a first frame. The process continues until the polling length allows enough time for the slave SEU to complete the task.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system for distributing telephone signals and passenger service signals in an in-flight entertainment system, comprising:

a first memory to store passenger service data;

a second memory to store telephone data;

a serializer to multiplex the passenger service data and the telephone data onto a bus which distributes the signal to seat electronic units in the in-flight entertainment system, wherein the multiplexed passenger service data and telephone data includes a plurality of frames;

a transmitter to send a passenger service signal to a seat electronic unit in a first portion of a frame; and a receiver to detect an acknowledgment to the command in a second portion of a frame.

2. The system of claim 1 wherein the bus is an RS-485 bus.

3. The system of claim 1 wherein the telephone data and the passenger service data is time division multiplexed onto the bus.

4. The system of claim 1 wherein the first memory is a dual-port random access memory.

5. The system of claim 1 further comprising:

an address pointer circuit to indicate the location of data storage in the first memory.

6. The system of claim 1 further comprising:

a command stack first-in first-out memory to buffer information for transmission to the bus; and a response stack first-in first-out buffer to buffer information received from the bus.

7. The system of claim 1, further comprising:

a zone interface unit serving as a master to control the flow of data from the serializer; and a plurality of seat electronic units serving as slaves to receive the multiplexed signal from the serializer.

8. A method of distributing telephone and passenger service signals in an in-flight entertainment system comprising:

storing telephone data in a first memory;

storing passenger service signals in a second memory;

multiplexing the telephone data in the first memory with the passenger service signals in the second memory to create a multiplexed stream of data that includes a plurality of frames for output on a bus; and transmitting a passenger service signal command to a seat electronic unit in a first portion of a frame and receiving an acknowledgment to the command in a second portion of a frame.

9. The method of claim 8 wherein the multiplexing is time division multiplexing which generates a synchronous stream of passenger service signals and telephone signals.

10. The method of claim 8 further comprising:

receiving the multiplexed stream at a seat electronic unit and transmitting a response on the bus.

11. The method of claim 8 wherein the bus is a bi-directional RS-485 bus.

12. The method of claim 8 further comprising:

transmitting a telephone command to the seat electronic unit in the first portion of the frame and receiving an acknowledgment to the command in a second portion of the frame.

13. The method of claim 8 further comprising:

polling the seat electronic unit in a subsequent frame to determine whether the passenger service signal command has been completed.

14. A master/slave system for transmitting passenger service signals and telephone data comprising:

a zone interface unit to receive telephone signals from a telephone line and passenger service signals, from a passenger service signal line, the zone interface unit acting as a master to initiate data transmission including passenger service signal commands and telephone signal commands in a first portion of a frame of multiplexed data;

a seat electronic unit to act as a slave, the seat electronic unit to receive the first portion of the frame of multiplexed data and respond with an acknowledgment in the second portion of the frame of multiplexed data.

15. A system of claim 14 wherein the telephone signals from the telephone line conform to an E-1 standard of telephone transmission.

16. The system of claim 14 further comprising:

a telephone coupled to the seat electronic unit, the telephone receiving digitized audio signals in the first portion of the frame of multiplexed data and transmitting digitized audio signals in the second portion of the frame of multiplexed data to the zone interface unit.

* * * * *